United States Patent
Kim (10) Patent No.: US 7,714,929 B2
(45) Date of Patent: May 11, 2010

(54) METHOD FOR SETTING AND ADAPTING PRESET WHITE BALANCE OF DIGITAL PHOTOGRAPHING APPARATUS AND DIGITAL PHOTOGRAPHING APPARATUS PERFORMING THE SAME

(75) Inventor: Yong-gi Kim, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 1460 days.

(21) Appl. No.: 11/024,253

(22) Filed: Dec. 28, 2004

(65) Prior Publication Data
US 2005/0151855 A1    Jul. 14, 2005

(30) Foreign Application Priority Data
Jan. 14, 2004    (KR)    ...................... 10-2004-0002683

(51) Int. Cl.
*H04N 5/222*    (2006.01)
(52) U.S. Cl. .................. 348/371; 348/223.1; 348/224.1; 348/225.1; 348/229.1

(58) Field of Classification Search ............... 348/223.1, 348/224.1, 225.1, 229.1, 371; 358/474, 516; 382/169, 251, 274
See application file for complete search history.

(56) References Cited

U.S. PATENT DOCUMENTS

| 2004/0017594 A1* | 1/2004 | Suekane et al. ............. 358/516 |
| 2004/0075762 A1* | 4/2004 | Okubo ........................ 348/371 |

FOREIGN PATENT DOCUMENTS

| JP | 02288575 A | * 11/1990 |
| JP | 07-143496 A | 6/1995 |

* cited by examiner

*Primary Examiner*—Yogesh K Aggarwal
(74) *Attorney, Agent, or Firm*—Drinker Biddle & Reath LLP (57) ABSTRACT

A method for setting and applying preset white balance data of a digital photographing apparatus and a digital photographing apparatus employing the method are provided. The method for setting the preset white balance of a digital photographing apparatus in order to apply the preset white balance data of the digital photographing apparatus includes setting non-flash white balance data when flash light is not emitted and setting flash white balance data when the flash light is emitted.

9 Claims, 6 Drawing Sheets

METHOD FOR SETTING AND ADAPTING PRESET WHITE BALANCE OF DIGITAL PHOTOGRAPHING APPARATUS AND DIGITAL PHOTOGRAPHING APPARATUS PERFORMING THE SAME

BACKGROUND OF THE INVENTION

This application claims the priority of Korean Patent Application No. 2004-2683, filed on Jan. 14, 2004, in the Korean Intellectual Property Office, the disclosure of which is incorporated herein in its entirety by reference.

1. Field of the Invention

The present invention relates to a method for setting and applying preset white balance data of a digital photographing apparatus, and more particularly, to the application of such a method to an apparatus such as a digital camera or a digital camcorder.

2. Description of the Related Art

In general, a digital photographing apparatus, such as a digital camera or a digital camcorder, provides an auto white balance (AWB) function. According to the AWB function, when a digital photographing apparatus is shipped for the market, white balance data with respect to light sources is set in advance. When an image is photographed, the actual white balance data is compared with the white balance data which was set in advance. The apparatus then compensates for any differences with respect to the light sources by automatically adjusting the actual white balance data.

In a digital photographing apparatus, a preset white balance (PWB) function is provided with the auto white balance function. Through this preset white balance function, a user of the digital photographing apparatus can set a white balance arbitrarily. That is, in a state where a preset mode is selected in order to apply white balance data, white paper is placed in front of the digital photographing apparatus and the shutter button is pressed, or a part to be expressed in a white color is selected. Then, the digital photographing apparatus adjusts the brightness of red, green, and blue to make the color expressed in white color, and by doing so, a desired color can be expressed.

In the conventional digital photographing apparatus, for example, in the video camera apparatus of Japanese Application Laid-Open 1995-143496, preset white balance data is usually set for either a non-flash condition or a flash condition. Accordingly, if white balance data under a non-flash condition is set and flash light is emitted during actual photographing, it is impossible to apply accurate white balance data to the object being actually photographed because the flash light condition is different from the extracted preset non-flash condition.

Canon, Inc. attempts to solve this problem in some of its digital camera models, e.g., models S45 and S50. In these models, Canon uses a method in which, according to a current surrounding brightness level, it is determined whether or not the brightness level satisfies the condition for emitting flash light. If the brightness satisfies the condition, white balance data for a flash condition is extracted; however, if the brightness does not satisfy the condition for emitting flash light, white balance data for a non-flash condition is extracted.

In this case, if flash light is emitted under the flash condition and flash light is not emitted under the non-flash condition, application of accurate white balance data will be enabled. However, if the surrounding brightness level changes between the time that it is first sensed and the time when the actual photograph is taken, the white balance data of the actual photograph will not be accurate. For example, the images will be implemented with colors different from the ones determined by the preset white balance data if either the preset white balance data for a non-flash condition is first obtained considering the brightness and the surrounding condition changes such that flash light is emitted or if the preset white balance data for a flash condition is obtained but flash light is not emitted.

SUMMARY OF THE INVENTION

The present invention provides a method for setting preset white balance data of a digital photographing apparatus. Under the present method, preset white balance data is set such that an optimal preset white balance can be obtained during actual photographing both when flash light is emitted and when it is not emitted.

According to an aspect of the present invention, there is provided a method for setting the preset white balance of a digital photographing apparatus, for application thereto, which includes setting non-flash white balance data when flash light is not emitted and setting flash white balance data when flash light is emitted.

According to another aspect of the present invention, there is provided a method for setting the preset white balance of a digital photographing apparatus, for application thereto, which includes the following steps: obtaining non-flash image data when flash light is not emitted, using the non-flash image data to set the non-flash white balance data; obtaining flash image data when flash light is emitted; and, by performing arithmetic calculations, using the flash image data and non-flash image data in order to set the flash white balance data when flash light is emitted.

According to still another aspect of the present invention, there is provided a method for setting the preset white balance of a digital photographing apparatus, for application thereto, including: obtaining flash image data when flash light is emitted; using the flash image data, to set the flash white balance data; obtaining non-flash image data when flash light is not emitted; and, by performing arithmetic calculations, using the flash image data and non-flash image data to set the non-flash white balance data when flash light is not emitted.

According to yet still another aspect of the present invention, there is provided a method for applying to a digital photographing apparatus the preset white balance data which has been set by any one of the methods for setting white balance data, the method including: applying the non-flash white balance data as the preset white balance data if the flash light is not emitted when an object is photographed; and, if flash light is emitted when an object is photographed, first combining the flash white balance data and the non-flash white balance data with respect to the brightness when the flash light is emitted and then applying the combined data as the preset white balance data.

According to the methods for setting and applying preset white balance data described above, the most accurate colors, those that are the most similar to what are seen by naked eyes, can be photographed whether or not flash light is emitted.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
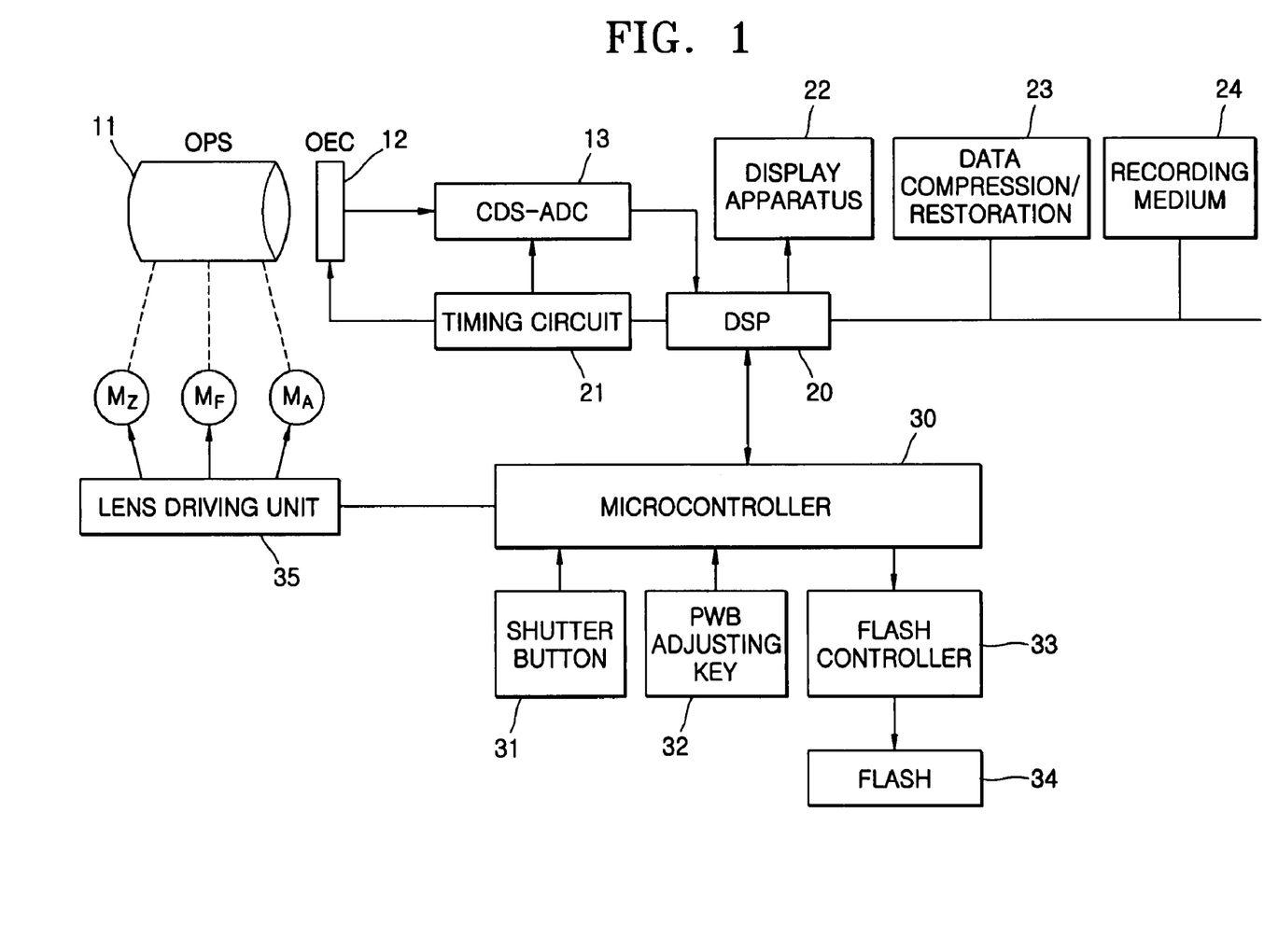
FIG. 1 is a block diagram showing the flow of a signal when preset white balance data of a digital photographing apparatus according to the present invention is set and applied.
Figure 2:
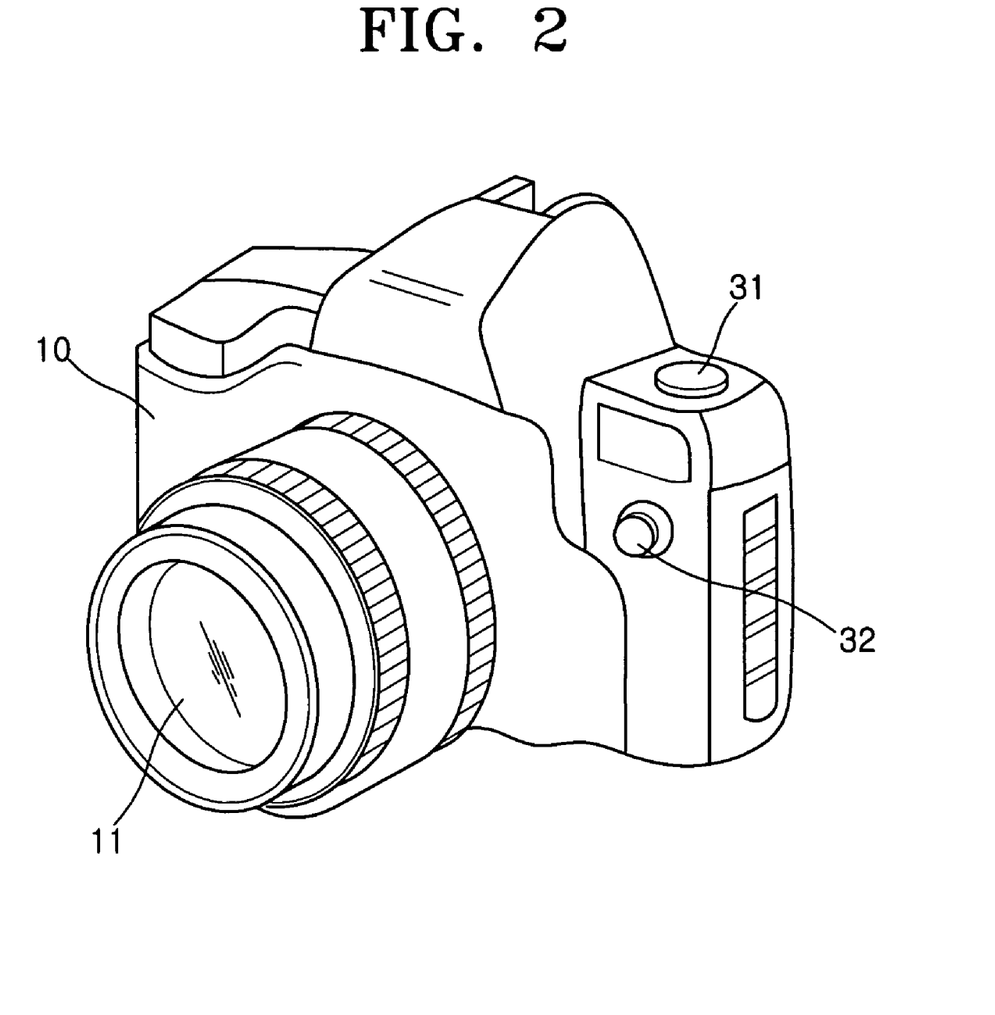
FIG. 2 is a schematic perspective view of an example of a digital photographing apparatus employed in the present invention.

Referring to FIGS. 1 and 2, an embodiment of a structure for setting and applying preset white balance data of a digital camera 10 will now be explained. Though a digital camera is taken as an example for convenience of explanation here in FIGS. 1 and 2, the present invention is not limited to this and can be applied to any digital photographing apparatus which photographs an object and records or reproduces the image.

Light incident from the object is processed by an optical system (OPS) 11 and the lens unit in the optical system 11 includes a zoom lens, a focus lens, and a compensation lens.

Light incident through the optical system 11 is converted into an electric analog signal by an optic-to-electric conversion (OEC) unit 12 such as a charge coupled device (CCD) or a complementary metal-oxide semiconductor (CMOS) device.

By an analog-digital conversion unit 13, which is a correlation double sampler and analog-to-digital converter (CDS-ADC) device, high frequency noise in the analog signal converted by the OEC unit 12 is removed, the amplitude is adjusted, and the analog signal is converted into a digital signal.

The digital signal from the analog-digital conversion unit 13 is processed by a digital signal processor (DSP) 20, and a digital image signal in which a luminance signal and a chrominance signal are divided is generated. In this case, the DSP 20 controls a timing circuit 21 such that the operations of the OEC unit 12 and the analog-digital conversion unit 13 are controlled.

Meanwhile, a white balance is controlled by a microcontroller 30. That is, according to a signal of a preset white balance adjusting key 32, the microcontroller 30 generates a control signal for setting white balance data and a control signal for photographing an object and, by doing so, controls the entire operation of the digital camera 10. In addition, when a shutter button 31 is pressed, the microcontroller 30 controls the operation of a flash controller 33 such that the flash 34 is driven.

According to the preset white balance adjustment control signal and the control signal for photographing an object generated and provided by the microcontroller 30, the DSP 20 stores an image signal, which is digitized and input, of an object when flash light is emitted or not emitted, as a reference value, and uses the stored reference value to calculate an image signal of an object photographed under an actual light source and input and, by doing so, adjusts a white balance.

The image signal and reproduction signal of the object signal-processed in the DSP 20 is displayed by a display apparatus 22. In this case, the image data of the object for which a preset white balance is adjusted in the DSP 20 is compressed in a predetermined ratio in a data compression/restoration unit 23 according to the control signal of the microcontroller 30, recorded in a recording medium 24, and displayed on the display apparatus 22.

Figure 3:
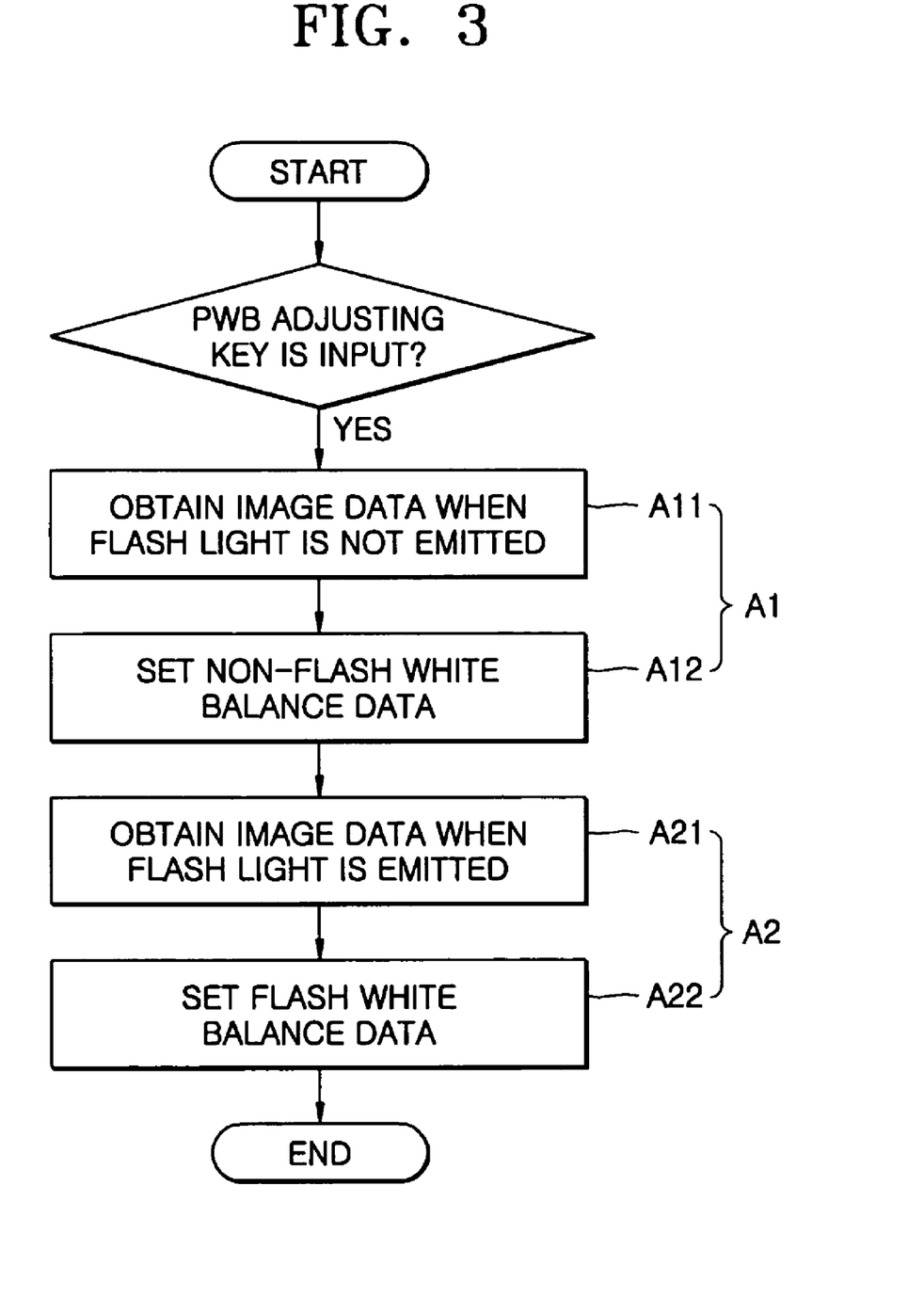
FIG. 3 is a flowchart of the steps performed by a method for setting a preset white balance data of a digital photographing apparatus according to an embodiment of the present invention.

FIG. 3 shows a signal flowchart for a method for setting preset white balance data of a digital photographing apparatus according to a first embodiment of the present invention among digital photographing apparatuses having a process as described above in order to adjust and operate a preset white balance.

As shown in FIG. 3, if the preset white mode is selected, step A1 and step A2 are performed. Step A1 is for setting non-flash white balance data when flash light is not emitted, and step A2 is for setting flash white balance data when flash light is emitted.

In a preferred embodiment of the present invention, step A1 for extracting non-flash white balance data includes step A11 for obtaining non-flash image data through an optical system when flash light is not emitted and step A12 for setting non-flash white balance data by using the obtained non-flash image data. Also, preferably, step A2 for setting flash white balance data includes step A21 for obtaining flash image data through an optical system when flash light is emitted and step A22 for setting flash white balance data by using the obtained flash image data.

Here, in steps A1 and A2 for setting non-flash and flash white balance data, non-flash white balance data can be first extracted and then flash white balance data can be extracted as shown in FIG. 3. Alternatively, flash white balance data can be first extracted and then non-flash white balance data can be set.

As a result, appropriate white balance data is set for both flash and non-flash conditions, and accordingly, when an image is photographed after that time, accurate preset white balance data can be appropriately applied whether or not flash light is emitted.

Figure 4:
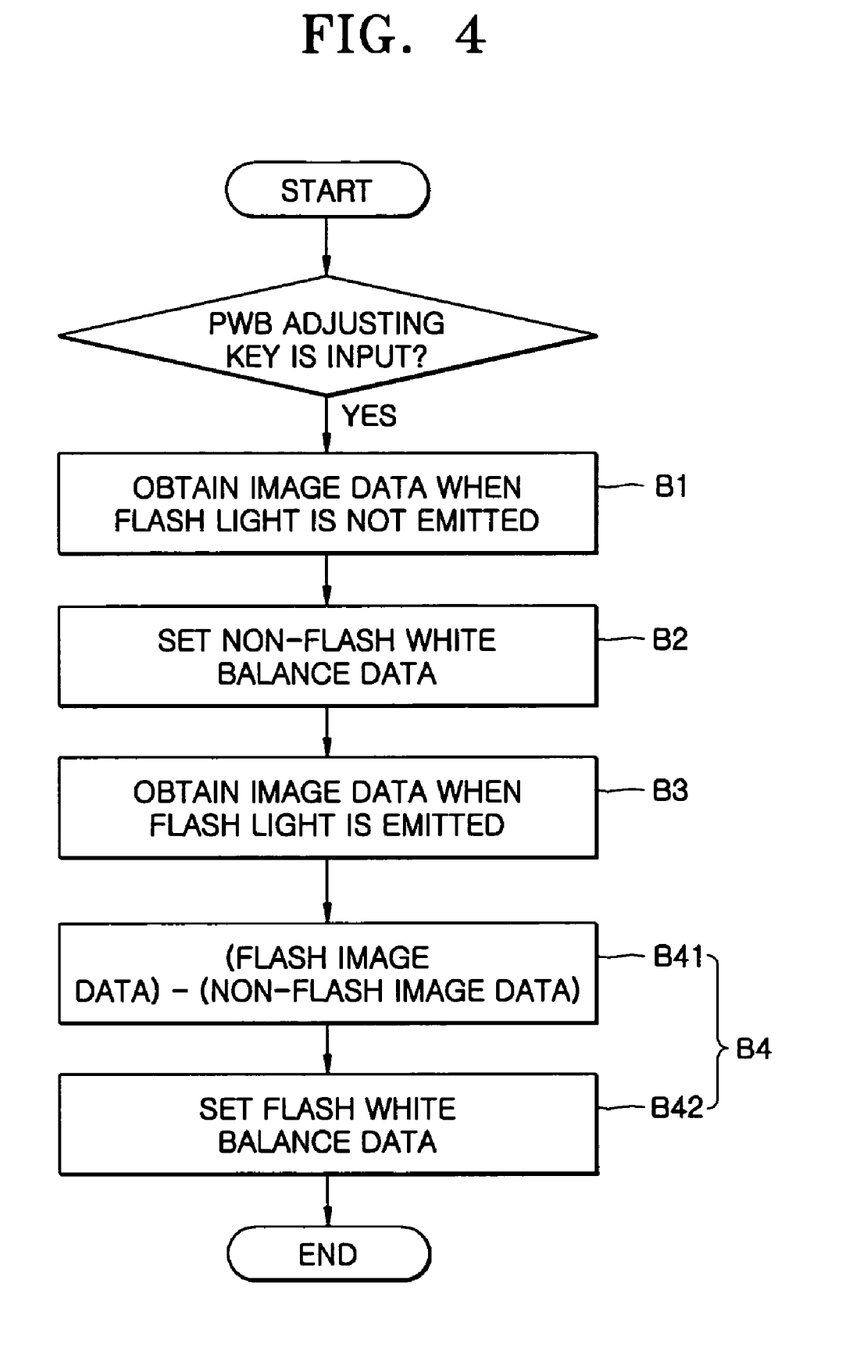
FIG. 4 is a flowchart of the steps performed by a method for setting a preset white balance data of a digital photographing apparatus according to another embodiment of the present invention.

Another embodiment of the present invention is illustrated in the signal flowchart of FIG. 4. As shown in FIG. 4, if a preset white balance adjusting key signal is input, non-flash white balance can be set by performing both step B1 for obtaining image data when flash light is not emitted and step B2 for extracting and setting the non-flash white balance data. Flash white balance data is then set by performing steps B3 and B4. After performing step B3 for obtaining image data when flash light is emitted, arithmetic calculation of the flash image data and non-flash image data is performed in step B4 for extracting flash white balance data when flash light is emitted. In this case, in the arithmetic calculation, the difference value of the flash image data and non-flash image data is obtained such that flash white balance data can be extracted.

In a preferred embodiment, step B4 includes steps B41 and B42. Arithmetic calculation of the non-flash image data obtained in step B1 and the flash image data obtained in step B3 is performed in step B41. Then, in step B42, white balance data when flash light is emitted is extracted by using this arithmetic calculation.

In this case, there are many methods for extracting the flash white balance data when flash light is emitted, by using the arithmetic calculation. In an embodiment of the present invention, the flash white balance data values are usually obtained as an R gain, a G gain, and a B gain.

A method for obtaining average gains of R, G, and B will now be discussed. First, through step B2, non-flash image data is obtained. By using the non-flash image data, the average R, G, and B gains of the object can be obtained. Then, a gain factor (a) when flash light is emitted is obtained by calculating the difference between the values of the non-flash image data obtained in step B2 and the flash image data obtained in step B3. The obtained gain factor (a) when flash light is emitted is calculated with the average gains of R, G, and B, as the following equation 1, such that the flash R gain, flash G gain, and flash B gain that comprise the flash white balance data of step B42 can be set:

Flash $R$ gain=$a$/average $R$ gain

Flash $G$ gain=$a$/average $G$ gain

Flash $B$ gain=$a$/average $B$ gain    (1)

Figure 5:
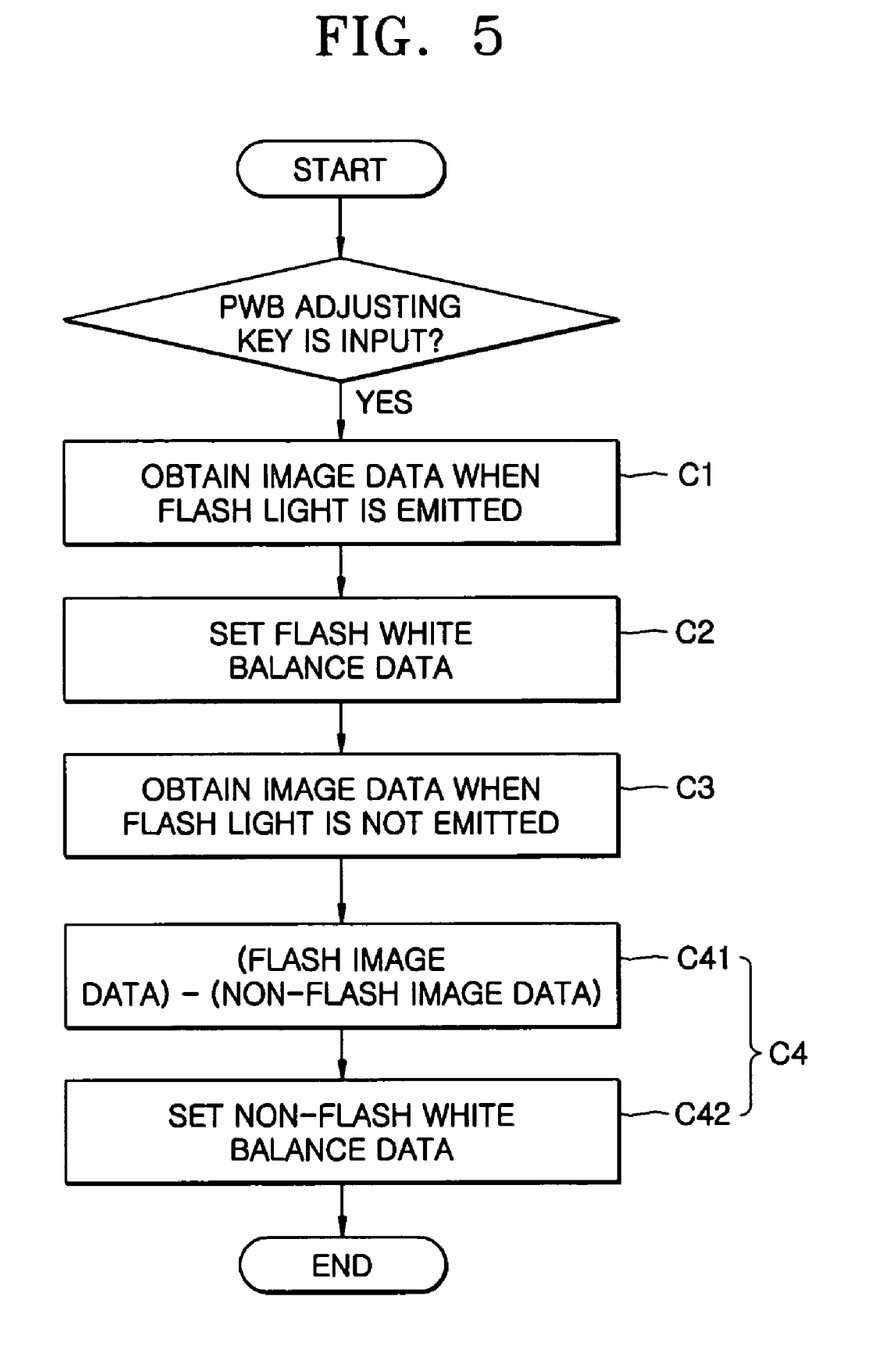
FIG. 5 is a flowchart of the steps performed by a method for setting a preset white balance data of a digital photographing apparatus according to still another embodiment of the present invention.

FIG. 5 is a signal flowchart of the steps performed by a method for setting a preset white balance data of a digital photographing apparatus according to a third preferred embodiment of the present invention. As shown in FIG. 5, if preset white balance adjustment is selected, flash white balance data can be set by performing step C1 for obtaining image data when flash light is emitted and step C2 for extracting and setting flash white balance data when flash light is emitted.

Then, by performing step C3 for obtaining image data when flash light is not emitted and step C4 for extracting non-flash white balance data when flash light is not emitted by performing arithmetic calculations with the flash image and the non-flash image, non-flash white balance data can be set.

In a preferred embodiment, step C4 includes steps C41 and C42. Step C41 is for performing arithmetic calculations with the image data when flash light is not emitted and image data when flash light is emitted; step C42 is for extracting and setting non-flash white balance data when flash light is not emitted by using the arithmetic calculation. In this case, the arithmetic calculation is performed by calculating the difference between flash image data and non-flash image data, and by doing so, flash white balance data can be easily extracted.

There are many methods available for performing arithmetic calculation and setting non-flash white balance data in step C4. As an example of the methods, in the same manner as in the second embodiment of the present invention, first, average gains of R, G, and B are obtained in steps C1 and C2. Also, by performing step C41, the difference value of flash image data and non-flash image data is obtained such that the gain factor (a) when flash light is not emitted is obtained. Then, by calculating the gain factor (a) and average gains of R, G, and B, non-flash white balance data can be obtained.

Figure 6:
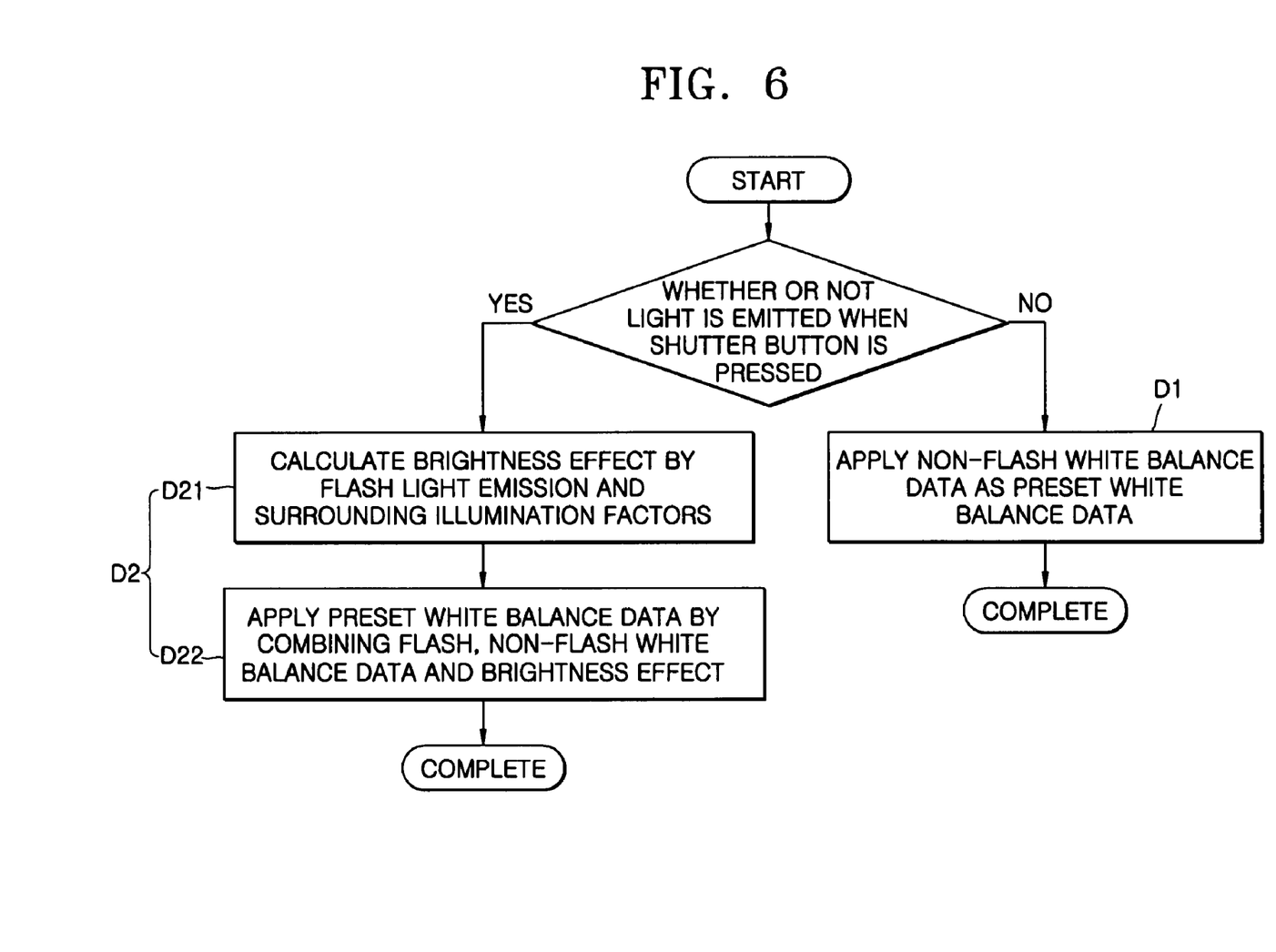
FIG. 6 is a flowchart of the steps performed by a method for applying a preset white balance data of a digital photographing apparatus of the present invention.

After non-flash white balance data and flash white balance data are extracted and set by performing step A3, B4, or C4, an embodiment of the present invention includes a step for applying preset white balance data according to whether or not flash light is emitted when an object is photographed. That is, as the flowchart of FIG. 6 illustrates, when the shutter button is pressed, if flash light is not emitted, step D1 applying the non-flash white balance data as the preset white balance data is performed. If, however, flash light is emitted when the shutter button is pressed to take a photo, step D2 is performed by applying a combination of the flash white balance data and the non-flash white balance data with respect to the brightness when flash light is emitted.

An embodiment of the step D2 in FIG. 6 will now be explained. A light emission level of a flash is first extracted in a step for setting the preset white balance data. Then, when an object is photographed, if flash light is emitted, the digital photographing apparatus can identify the degree of brightness of the object. The degree of brightness of the object, however, is different from the amount of light emitted by the flash. That is, the overall brightness of the photographed object is affected by the pure light emission of the flash itself and at the same time by the surrounding illumination at the location of the object. Here, where the in the brightness is affected by the flash, it is preferable to use flash white balance data. On the other hand, where the overall brightness is not impacted by a flash, it is preferable to apply the preset white balance data by using non-flash white balance data.

Step D2 includes step D21 for calculating the brightness effect by obtaining the ratio of brightness generated purely by the flash light emission and the ratio of brightness caused by surrounding illumination. This is accomplished by comparing the brightness of the flash itself with the overall brightness when an object is actually photographed.

After performing step D21, step D22 is performed such that preset gains of R, G, and B that comprise preset white balance data are applied. Step D22 includes multiplying the flash brightness effect ratio by the flash white balance data and then adding the resultant value to a value that is obtained by multiplying the surrounding illumination brightness ratio by the non-flash white balance data. That is, assuming that the ratio of the brightness effect purely from surrounding illumination is p, flash white balance data when flash light is emitted is comprised of flash gains of R, G, and B, and further assuming that non-flash white balance data when flash light is not emitted is comprised of non-flash gains of R, G, and B, the preset gains of R, G, and B which combine to create the preset white balance data when flash light is emitted can be obtained as the following equation 2:

Preset $R$ gain=$\beta$×non-flash $R$ gain+$(1-\beta)$×flash $R$ gain

Preset $G$ gain=$\beta$×non-flash $G$ gain+$(1-\beta)$×flash $G$ gain

Preset $B$ gain=$\beta$×non-flash $B$ gain+$(1-\beta)$×flash $B$ gain    (2)

That is, when a signal directing the flash 34 of FIG. 1 to emit flash light is input through the microcontroller 30 of FIG. 1, the preset white balance data is applied by combining the flash white balance data and the non-flash white data with respect to brightness when flash light is emitted. On the other hand, if a signal directing the flash 34 of FIG. 1 not to emit flash light is input through the microcontroller 30 of FIG. 1, the DSP 20 of FIG. 1 sets non-flash white balance data as the preset white balance data. Thus, when an object is actually photographed, knowledge of whether flash light was emitted is used in order to set the most accurate preset white balance data for either a flash or non-flash photograph.

According to the conventional technology, irrespective of whether or not flash light is emitted when the shutter button is actually pressed, flash white balance data and non-flash white balance data are arbitrarily set as a preset white balance. Accordingly, there is a problem that when a shutter button is pressed to actually photograph an object, if the surrounding condition is different from the surrounding condition assumed in the presetting stage, the set preset white balance data becomes different from the preset white balance data desired by the user. However, when employing the method for setting and applying preset white balance data according to the present invention, preset white balance data is set such that an accurate preset white balance can be set based upon whether or not flash light is emitted when the shutter button is actually pressed.

What is claimed is:

1. A method for applying preset white balance data of a digital photographing apparatus, the method being performed via the digital photographing apparatus and the method comprising:

obtaining a flash light brightness effect ratio and a surrounding illumination brightness effect ratio when an object is photographed under a flash condition;

combining preset flash white balance data and preset non-flash white balance data by multiplying the flash light brightness effect ratio with preset flash white balance data and adding a resultant value to a value that is obtained by multiplying the surrounding illumination brightness effect ratio with preset non-flash white balance data; and applying the combined preset white balance data to an image of the object obtained during the photographing under the flash condition.

2. The method of claim 1, further comprising:

obtaining non-flash image data when the flash light is not emitted; and using the obtained non-flash image data to set the preset non-flash white balance data.

3. The method of claim 1, further comprising:

obtaining flash image data when flash light is emitted; and using the obtained flash image data to set the preset flash white balance data.

4. A method for applying preset white balance data of a digital photographing apparatus, the method being performed via the digital photographing apparatus and the method comprising:

setting preset white balance data, wherein the step of setting preset white balance data comprises setting non-flash white balance data when a flash light is not emitted and setting flash white balance data when the flash light is emitted; and when an object is photographed, if the flash light is not emitted, applying the non-flash white balance data as the preset white balance data; and if the flash light is emitted, combining the flash white balance data and the non-flash white data with respect to a brightness level when the flash light is emitted and then applying the combined data as the preset white balance data, wherein the step of combining the flash white balance data and the non-flash white data and then applying the combined data comprises:

obtaining a flash light brightness effect ratio and a surrounding illumination brightness effect ratio when the object is photographed; and multiplying the flash light brightness effect ratio by the flash white balance data and adding a resultant value to a value that is obtained by multiplying the surrounding illumination brightness effect ratio by the non-flash white balance data.

5. A digital photographing apparatus comprising:

a flash;

a flash controller;

means for obtaining a flash light brightness effect ratio and a surrounding illumination brightness effect ratio when an object is photographed under a flash condition;

means for combining preset flash white balance data and preset non-flash white balance data by multiplying the flash light brightness effect ratio with preset flash white balance data and adding a resultant value to a value that is obtained by multiplying the surrounding illumination brightness effect ratio with preset non-flash white balance data; and means for applying the combined preset white balance data to an image of the object obtained during the photographing under the flash condition.

6. The digital photographing apparatus of claim 5, further comprising:

a preset white balance adjusting key which is capable of transmitting a white balance adjusting mode control signal to a means for controlling operations of the apparatus.

7. The digital photographing apparatus of claim 6, wherein the means for controlling operations of the apparatus comprises a microcontroller.

8. The digital photographing apparatus of claim 5, wherein, when the apparatus is in a white balance adjusting mode, flash image data is obtained when a flash light is emitted;

flash white balance data is set;

non-flash image data is obtained when the flash light is not emitted;

non-flash white balance data is calculated from the flash image data and the non-flash image data; and the non-flash white balance data is set.

9. The digital photographing apparatus of claim 5, wherein, when the apparatus is in a white balance adjusting mode, non-flash image data is obtained when a flash light is not emitted;

non-flash white balance data is set;

flash image data is obtained when the flash light is emitted;

flash white balance data is calculated from the flash image data and the non-flash image data; and the flash white balance data is set.

* * * * *